(12) United States Patent
Baxter et al.

(10) Patent No.: US 10,933,362 B2
(45) Date of Patent: Mar. 2, 2021

(54) PULSE-JET VALVE PERFORMANCE MONITORING SYSTEM AND METHOD

(71) Applicant: Dust Company, Inc., Raleigh, NC (US)

(72) Inventors: Robert W. Baxter, Raleigh, NC (US); Derrick J. Hinkle, Louisburg, NC (US); Ralph E. Bard, Raleigh, NC (US)

(73) Assignee: DUST COMPANY, INC., Raleigh, NC (US)

( * ) Notice: Subject to any disclaimer, the term of this patent is extended or adjusted under 35 U.S.C. 154(b) by 234 days.

(21) Appl. No.: 16/042,658

(22) Filed: Jul. 23, 2018

(65) Prior Publication Data

US 2019/0076771 A1    Mar. 14, 2019

Related U.S. Application Data

(60) Provisional application No. 62/558,028, filed on Sep. 13, 2017.

(51) Int. Cl.
| | | |
|---|---|---|
| *B01D 46/00* | (2006.01) | |
| *B01D 46/44* | (2006.01) | |
| *B01D 39/08* | (2006.01) | |
| B01D 46/42 | (2006.01) | |
| B01D 46/02 | (2006.01) | |

(52) U.S. Cl.
CPC ......... *B01D 46/0068* (2013.01); *B01D 39/08* (2013.01); *B01D 46/0042* (2013.01); *B01D 46/0084* (2013.01); *B01D 46/44* (2013.01); B01D 46/023 (2013.01); B01D 46/4272 (2013.01); B01D 46/444 (2013.01); B01D 2273/18 (2013.01)

(58) Field of Classification Search
CPC ............ B01D 46/0042; B01D 46/0068; B01D 46/44; B01D 46/444; B01D 46/023; B01D 46/0084; B01D 2273/18; B01D 46/4272; B01D 39/08
See application file for complete search history.

(56) References Cited

U.S. PATENT DOCUMENTS

2017/0036154 A1*   2/2017   Lauterbrunner ... B01D 46/0068

FOREIGN PATENT DOCUMENTS

| EP | 2937128 | 10/2015 |
|---|---|---|
| GB | 1504625 | 3/1978 |
| WO | 9718026 | 5/1997 |

OTHER PUBLICATIONS

PCT International Search Report and Written Opinion, dated Nov. 20, 2018 for corresponding International Application No. PCT/US2018/050393 (14 pages).

* cited by examiner

*Primary Examiner* — Robert Clemente
(74) *Attorney, Agent, or Firm* — Myers Bigel, P.A (57) ABSTRACT

An system includes a fabric filter, an air supply system, a pulsing valve that is coupled to the air supply system and is configured to generate a statistical pulse of air that is directed to the fabric filter, an air flow monitor that is configured to monitor a flow of air associated with the statistical pulse of air, and a valve controller that is coupled to the air flow monitor that is configured to generate a performance signature for the pulsing valve based on the flow of air that was monitored.

14 Claims, 7 Drawing Sheets

PULSE-JET VALVE PERFORMANCE MONITORING SYSTEM AND METHOD

CROSS REFERENCE TO RELATED APPLICATION

The present application claims priority to U.S. Provisional Patent Application Ser. No. 62/558,028, filed Sep. 13, 2017, the entire content of which is incorporated by reference herein as if set forth in its entirety.

FIELD OF THE INVENTION

The present invention relates to industrial pollution control systems and, more particularly, to fabric filter monitoring and control systems for fabric filters. A fabric filter unit may comprise one or more compartments containing rows of fabric bags in the form of round, flat, or shaped tubes, or pleated cartridges. Fabric filters are sometimes referred to in industry as baghouses.

BACKGROUND

A baghouse or fabric filter, whether it uses traditional bags with cages or pleated cartridge filters, is an air pollution control device that removes particulates out of air or gas released from commercial processes or combustion for electricity generation. Many different types of industrial companies use baghouses to control emission of air pollutants including power plants, steel mills, pharmaceutical producers, food manufacturers, and chemical producers. Depending on the process requirements and/or air flow to be cleaned, baghouses can range from a single compartment filter to a large multi-compartment filter. Baghouses are generally defined by their cleaning methods. The two major categories are off-line cleaning baghouses and on-line cleaning baghouses. Off-line cleaning refers to the type of baghouse where the compartment is isolated and does not filter dirty air during the cleaning process. The types of baghouses using off-line cleaning include shakers, sonic horns, pulse-jet, and reverse air.

The pulse-jet style baghouse design is based on isolating the compartment and then firing the pulse-valves to generate a blast of air down each bag in a row. In some examples, pulse-jet baghouses use a pulse of compressed to send a pulse wave down a row of filtering bags to "shock" the filtered particles off of the outside of the bag so they can fall into the hopper below and be removed. This style of baghouse typically has one solenoid pilot valve for each row of bags. Larger baghouses may have split rows and may use two valves per row. The row valves are designed to open quickly to provide a short pulse and then close. Their source of air is normally a local supply header close to the valves. After the pulse, the header replenishes the pulsed air until it is at the desired pressure. The refilling process typically can take 1-5 seconds depending on the size and length of the supply line. In an off-line configuration, each compartment may use up to four additional outputs and four additional inputs. The outputs would be to open and close the inlet and output isolation valves and the input would be switches to confirm the isolation valve position.

Various techniques are used to monitor the electrical solenoid pilot valve and to provide open or closed circuit failure detection of electrical components of the solenoid pilot valve, but the pulse valve can fail in other ways. For example, the diaphragms can tear, leak, or fail. Debris from the compressed air system may disturb normal operation and functionality of the internal workings of the both the solenoid valve and/or the pulse valve. This can result in changes in the air flow rate to the blow pipe, which may affect the cleaning of the filter bags. A slow acting solenoid pilot valve may not release the air in the back part of the pulse valve quick enough to create a proper pulse of air down the cleaning tube. These situations may not be detected through monitoring of the electrical status of the solenoid pilot valve. The solenoid pilot valve may be operating properly from an electrical standpoint, but if the output port is blocked, the pulse valve will not operate properly. The discharge tubing may be bent or crimped, which may reduce or block the discharge air flow from the solenoid pilot valve, thereby affecting the overall performance of the system.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the disclosure.

Some embodiments of the inventive concept provide a system that comprises a fabric filter, an air supply system, a pulsing valve that is coupled to the air supply system and is configured to generate a statistical pulse of air that is directed to the fabric filter, an air flow monitor that is configured to monitor a flow of air associated with the statistical pulse of air, and a valve controller that is coupled to the air flow monitor that is configured to generate a performance signature for the pulsing valve based on the flow of air that was monitored.

In other embodiments, the system further comprises a blow pipe between the pulsing valve and the fabric filter that is configured to direct the statistical pulse of air to the fabric filter.

In still other embodiments, the system further comprises a pilot valve that is coupled to the pulsing valve and is configured to facilitate transitions of the pulsing valve between an open state and a closed state to generate the statistical pulse of air.

In still other embodiments, the air supply system comprises a main compressed air supply source that is coupled to the blow pipe and the pulsing valve.

In still other embodiments, the air supply system further comprises a header supply tank that is coupled between the main compressed air supply source and both of the blow pipe and the pulsing valve.

In still other embodiments, the valve controller is further configured to generate the performance signature for the pulsing valve based on at least one of a maximum air flow rate during the statistical pulse of air, a time duration of the statistical pulse of air, a total air consumption during the statistical pulse of air, a flow rate increase during the statistical pulse of air, and a flow rate decrease during the statistical pulse of air.

In some embodiments of the inventive concept, a system comprises a fabric filter, an air supply system, a pulsing valve that is coupled to the air supply system and is configured to generate a statistical pulse of air that is directed to the fabric filter, an air flow monitor that is configured to monitor a flow of air associated with the statistical pulse of air, and a valve controller that is coupled to the air flow monitor that is configured to generate a current performance signature for the pulsing valve based on the flow of air that was monitored and to compare the current performance signature to a baseline performance signature that was previously generated for the pulsing valve, the valve controller being further configured to identify a performance deviation in the pulsing valve based on a difference between the current performance signature and the baseline performance signature.

In further embodiments, the valve controller is further configured to compare the performance deviation to a performance threshold and to determine that the pulsing valve is faulty based the comparison of the performance deviation to the performance threshold.

In still further embodiments, the performance deviation comprises at least one of a reduction in a maximum air flow rate during the statistical pulse of air, a change in a time duration of the statistical pulse of air, a change in a total air consumption during the statistical pulse of air, a change in a flow rate increase during the statistical pulse of air, and a change in a flow rate decrease during the statistical pulse of air.

In some embodiments of the inventive concept, a method comprises operating a pulsing valve that is coupled between an air supply system and a fabric filter, wherein operating the pulsing valve comprises generating a statistical pulse of air that is directed to the fabric filter, monitoring the flow of air associated with the statistical pulse of air, and generating a performance signature for the pulsing valve based on the flow of air that was monitored.

In other embodiments, the method further comprises directing the statistical pulse of air to the fabric filter using a blow pipe between the pulsing valve and the fabric filter.

In still other embodiments, generating the statistical pulse of air comprises transitioning the pulsing valve between an open state and a closed state responsive to operation of a pilot valve.

In still other embodiments, the air supply system comprises a main compressed air supply source that is coupled to the blow pipe and the pulsing valve.

In still other embodiments, the air supply system further comprises a header supply tank that is coupled between the main compressed air supply source and both of the blow pipe and the pulsing valve.

In still other embodiments, generating the performance signature for the pulsing valve further comprises generating the performance signature for the pulsing valve based on at least one of a maximum air flow rate during the statistical pulse of air, a time duration of the statistical pulse of air, a total air consumption during the statistical pulse of air, a flow rate increase during the statistical pulse of air, and a flow rate decrease during the statistical pulse of air.

In some embodiments of the inventive concept, a method comprises operating a pulsing valve that is coupled between an air supply system and a fabric filter, wherein operating the pulsing valve comprises generating a statistical pulse of air that is directed to the fabric filter, monitoring the flow of air associated with the statistical pulse of air, and generating a current performance signature for the pulsing valve based on the flow of air that was monitored, comparing the current performance signature to a baseline performance signature that was previously generated for the pulsing valve, and identifying a performance deviation in the pulsing valve based on a difference between the current performance signature and the baseline performance signature.

In further embodiments, the method further comprises comparing the performance deviation to a performance threshold and determining that the pulsing valve is faulty based the comparison of the performance deviation to the performance threshold.

In still further embodiments, the performance deviation comprises at least one of a reduction in a maximum air flow rate during the statistical pulse of air, a change in a time duration of the statistical pulse of air, a change in a total air consumption during the statistical pulse of air, a change in a flow rate increase during the statistical pulse of air, and a change in a flow rate decrease during the statistical pulse of air.

Other methods, systems, computer program products and/or apparatus according to embodiments of the inventive concept will be or become apparent to one with skill in the art upon review of the following drawings and detailed description. It is intended that all such additional methods, systems, computer program products, and/or apparatus be included within this description, be within the scope of the present invention, and be protected by the accompanying claims. It is noted that aspects of the invention described with respect to one embodiment, may be incorporated in a different embodiment although not specifically described relative thereto. That is, all embodiments and/or features of any embodiment can be combined in any way and/or combination.

BRIEF DESCRIPTION OF THE DRAWINGS

The accompanying drawings, which are included to provide a further understanding of the invention and are incorporated in and constitute a part of this application, illustrate certain embodiment(s) of the invention.

DETAILED DESCRIPTION

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

As used herein, the singular forms "a," "an," and "the" are intended to include the plural forms as well, unless expressly stated otherwise. It should be further understood that the terms "comprises" and/or "comprising" when used in this specification is taken to specify the presence of stated features, integers, steps, operations, elements, and/or components, but does not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Embodiments of the inventive subject matter are described herein with respect to maintaining a fabric filter including the cleaning thereof. As described above, a fabric filter unit may comprise one or more compartments containing rows of fabric bags in the form of round, flat, or shaped tubes, and/or pleated cartridges. Fabric filters may be referred to in industry as baghouses.

As used herein a statistical pulse of air that is generated in response to the opening and closing of a solenoid pilot valve or pulsing valve has a duration that begins with the opening of the valve and ends when the air flow returns to an ambient level, typically zero or no flow, and/or ends when a pressure in a header supply tank returns to an ambient pressure level after dropping in response to the opening of the valve.

Techniques used to monitor the integrity valve systems that are used to clean fabric filters through application of compressed air, such as baghouses, are typically based on the electrical operation of a solenoid pilot valve. Some embodiments of the inventive concept stem from a realization that the valve systems, such as the pulsing valve, may be faulty and not operating in accordance with a desired level of performance even though the electro-mechanical components of the solenoid pilot valve are opening and closing the valve. The degraded performance of the solenoid pilot valve and/or pulsing valve, for example, may negatively affect the cleaning of fabric filters, such as baghouses. In some embodiments, compressed air flow from the main air supply to the header supply tank is monitored to build a statistical signature or fingerprint based on one or more performance parameters associated with each of the pulsing valves. A baseline performance signature can then be established based on the system configuration. A performance deviation can be detected through monitoring of the air flow associated with the pulses used to clean the fabric filters (e.g., baghouses). In accordance with various embodiments of the inventive concept, the performance signature for a pulsing valve may be based on one or more metrics including, but not limited to, a maximum air flow rate during the statistical pulse of air, a time duration of the statistical pulse of air, a total air consumption during the statistical pulse of air, a flow rate increase during the statistical pulse of air, and a flow rate decrease during the statistical pulse of air. Changes in one or more of these metrics may be detected. Thresholds may be set for each metric and, based on the number of metrics with deviations that exceed the associated threshold and/or the magnitude of deviation for each metric, a determination may be made whether a particular pulsing valve is faulty, i.e., its performance has degraded to a level that intervention may be needed in the form of maintenance or replacement, for example.

Figure 1:
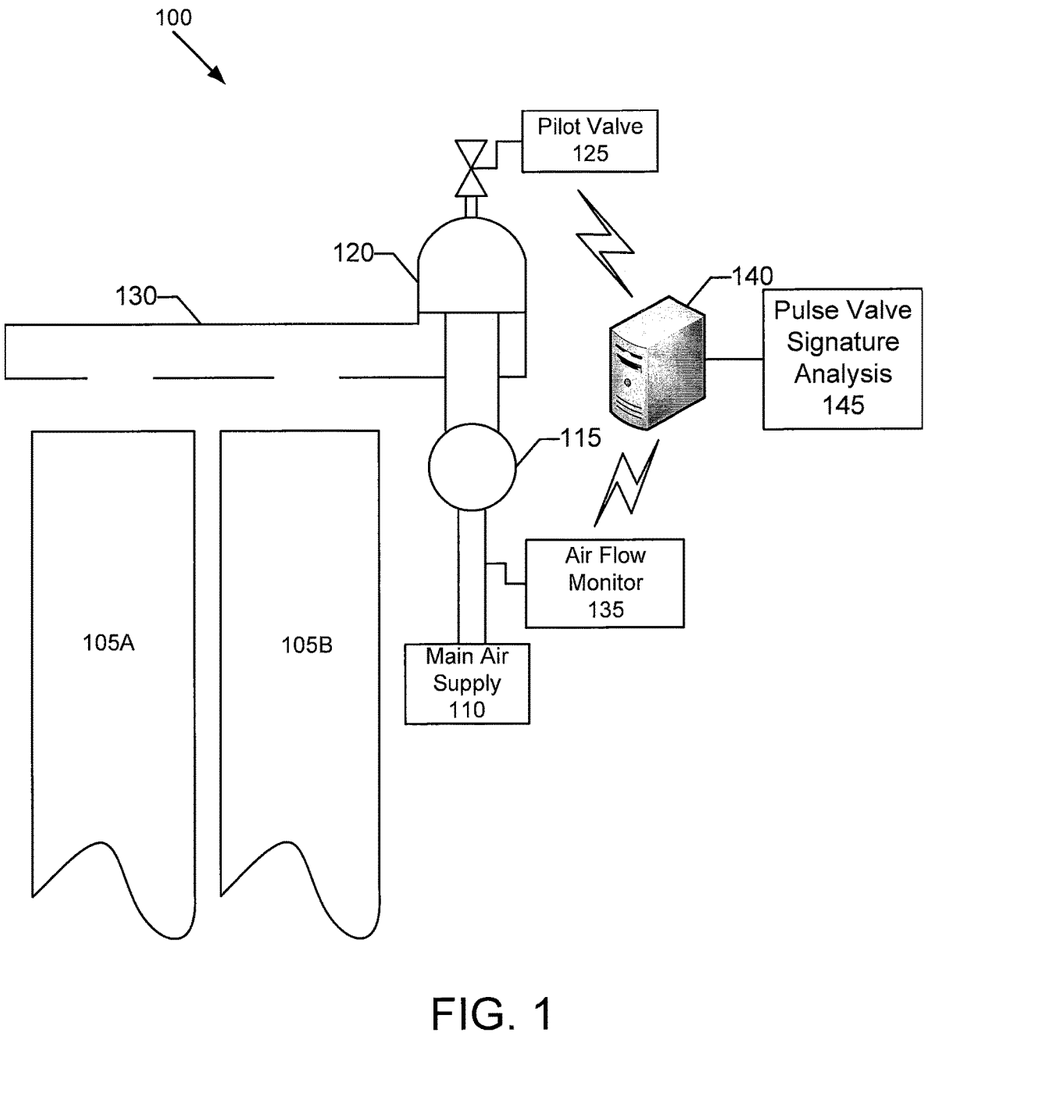
FIGS. 1 and 2 are diagrams that illustrate a system for cleaning a fabric filter, such as a baghouse, using compressed air according to some embodiments of the inventive concept.

FIG. 1 is a diagram that illustrates a system 100 for cleaning a fabric filter, such as a baghouse, using compressed air according to some embodiments of the inventive concept. As shown in FIG. 1, two fabric filters 105A and 105B are cleaned using a common air supply and valve system. The air supply includes a main air supply 110 and a header supply tank 115, which stores the compressed air in relatively close proximity to a control valve system. The control valve system includes a pulsing valve 120 and a solenoid pilot valve 125. The solenoid pilot valve 125 may be located on or near the pulsing valve 120 or may be located more remote from the pulsing valve 120 and connected with hose or piping. The pulsing valve 120 may be operable to release statistical pulses of compressed air down a blow tube 130, which directs the statistical air pulses into the fabric filters 105A and 105B to dislodge particles and other residue that accumulate in the filters. An air flow monitor 135 may be used to monitor one or more metrics of the air flow flowing through the pulsing valve during a cleaning pulse including, but not limited to, a maximum air flow rate during the statistical pulse of air, a time duration of the statistical pulse of air, a total air consumption during the statistical pulse of air, a flow rate increase during the statistical pulse of air, and a flow rate decrease during the statistical pulse of air. A valve controller 140 is communicatively coupled to both the solenoid pilot valve 125 and the air flow monitor 135. These connections may be wired and/or wireless connections in accordance with various embodiments of the inventive concept. The valve controller 140 may control operation of the solenoid pilot valve 125 to initiate and terminate statistical pulses of air used to clean the fabric filters 105A and 105B. The valve controller 140 includes a pulse valve signature analysis module 145 that is configured to receive performance metric information associated with the statistical pulses of air that are collected by the air flow monitor 135. The pulse valve signature analysis module 145 may generate a performance signature for a pulsing valve based on the performance metric information received from the air flow monitor 135.

Figure 2:
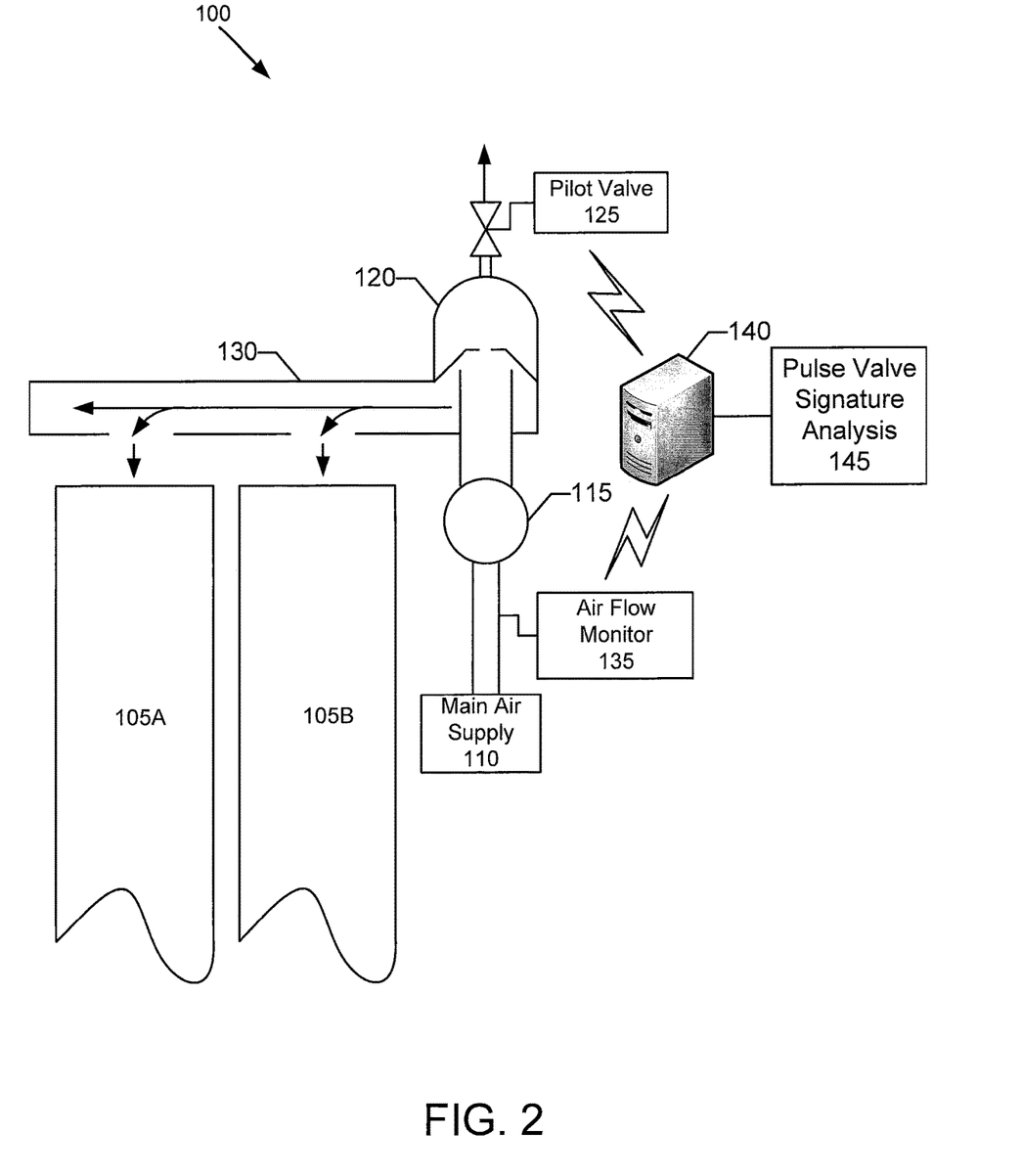

FIG. 1 illustrates the pulsing valve 120 in a closed state prior to delivery of a pulse of compressed air down the blow pipe 130 for cleaning the fabric filters 105A and 105B. FIG. 2 illustrates the system 100 for cleaning a fabric filter in which the pulsing valve 120 is in an open state thereby allowing a statistical pulse of compressed air to travel down the blow pipe 130 to clean the fabric filters 105A and 105B. Referring to FIGS. 1 and 2, delivery of a statistical air pulse to the fabric filters 105A and 105B includes operation of both the solenoid pilot valve 125 and the pulsing valve 120. When the solenoid pilot valve 125 is actuated, it allows compressed air to escape a chamber on the back side of pulsing valve's 120 diaphragm. Then the compressed air in the front part of the pulsing valve 120 pushes the diaphragm back to open the main discharge of the pulsing valve 120 sending a volume of compressed air from the header supply tank 115 to exit the pulse valve's 120 primary discharge. The pulse of air is sent down the blow pipe 130, which has holes on the underside directly above each fabric filter 105A and 105B in a row to clean the filters. When the solenoid pilot valve 125 closes, the compressed air is allowed to build up in the back part of the pulsing valve 120. This push closes the diaphragm to the main opening of the pulsing valve 120 and stops the air flow. When the pulsing valve 120 closes, the header supply tank 115 refills from the main air supply 110 before the next pulse.

Figure 8:
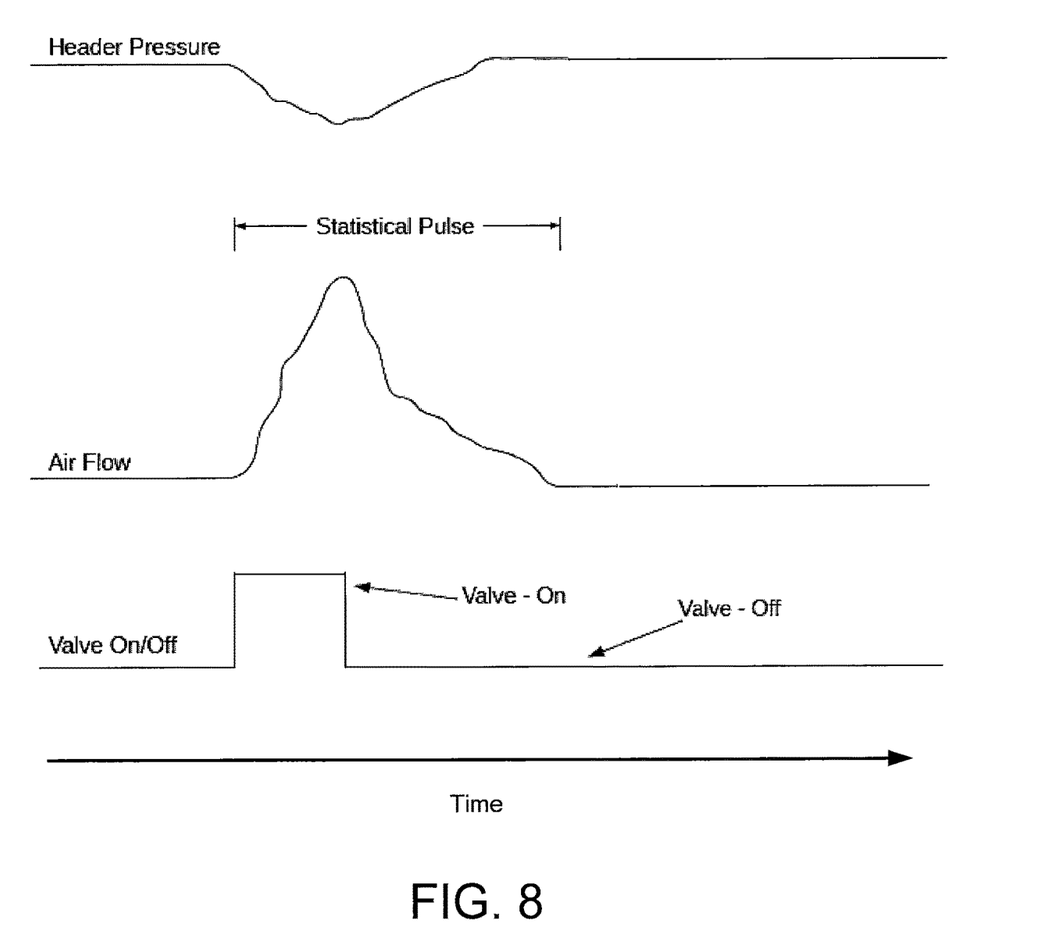
FIG. 8 illustrates an example of a statistical pulse generated in response to the operation of a solenoid pilot valve and a pulsing valve in accordance with some embodiments of the inventive concept.

FIG. 8 illustrates an example of a statistical pulse generated in response to the operation of the solenoid pilot valve 125 and the pulsing valve 120. As shown in FIG. 8, upon opening of the solenoid pilot valve 125 and the pulsing valve 120 (Valve—On state), the air flow down the blow pipe 130 increases while the pressure in the header supply tank 115 decreases. When the solenoid pilot valve 125 closes resulting in the diaphragm of the pulsing valve 120 also closing (Valve—Off state), the air flow down the blow pipe 130 begins to decrease and the header supply tank 115 begins to refill thereby increasing the pressure therein. The statistical pulse ends when the pressure in the header supply tank 115 returns to an ambient level and the air flow down the blow pipe 130 returns to an ambient level, which is typically approximately zero or no air flow.

Figure 3:
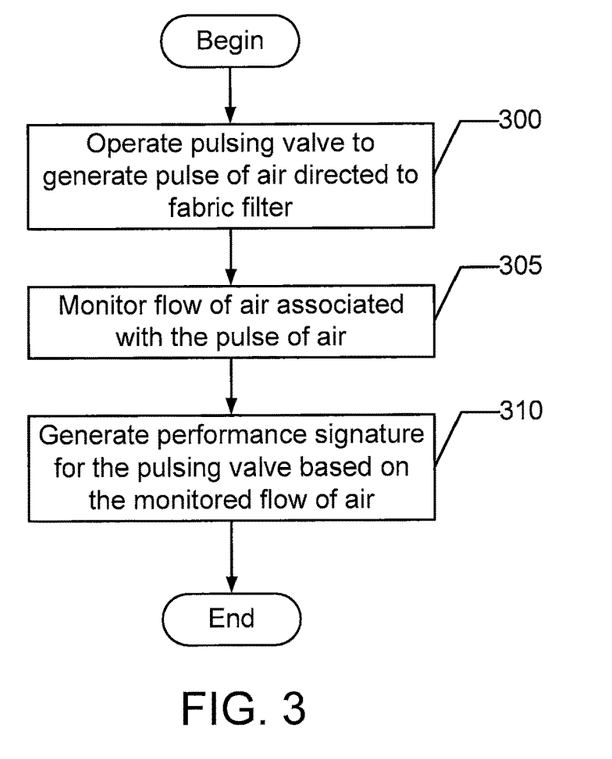
FIGS. 3-5 are flowcharts that illustrate operations for cleaning a fabric filter, such as a baghouse, using compressed air according to some embodiments of the inventive concept.
Figure 4:
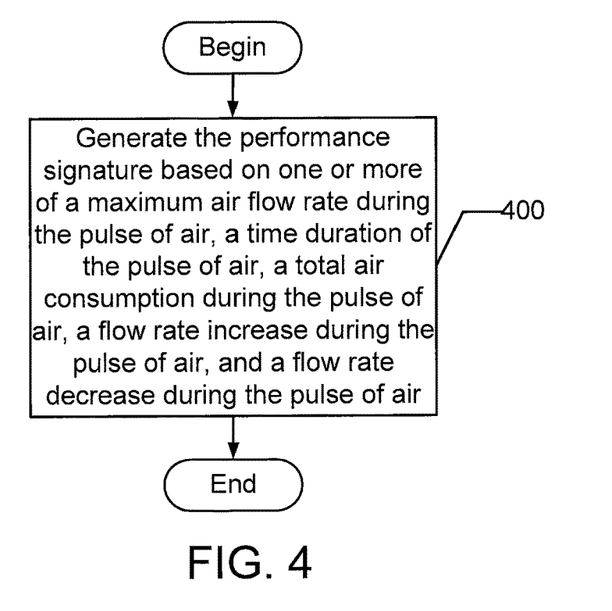
Figure 5:
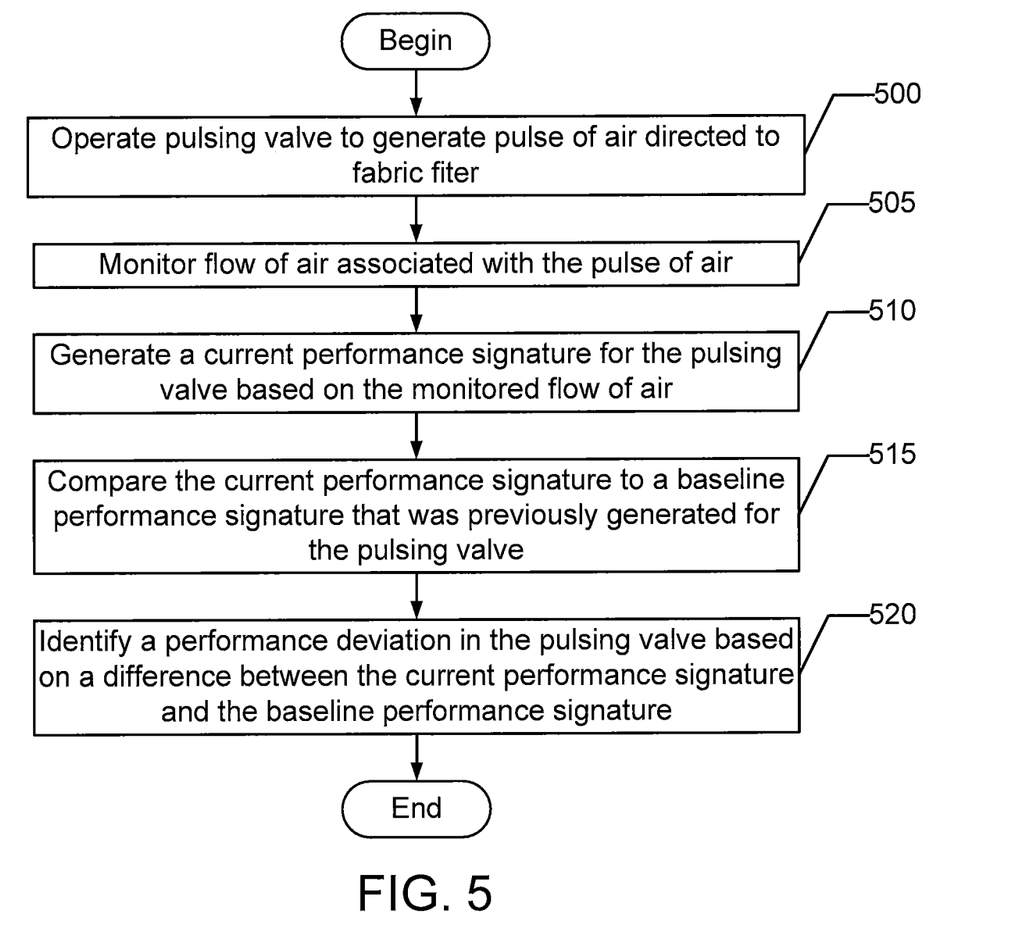

FIGS. 3-5 are flowcharts that illustrate operations for cleaning a fabric filter, such as a baghouse, using compressed air according to some embodiments of the inventive concept. Referring to FIG. 3, operations begin at block 300 where the pulsing valve 120 is operated to generate a statistical pulse of air directed to a fabric filter. The air flow monitor 135 monitors the flow of air associated with the statistical pulse of air at block 305 and the pulse valve signature analysis module 145 generates a performance signature for the pulsing valve based on the monitored flow of air at block 310. In some embodiments illustrated in FIG. 4, the performance signature is generated at block 400 based on one or more performance metrics of the air flow flowing through the pulsing valve 120 during a cleaning pulse including, but not limited to, a maximum air flow rate during the statistical pulse of air, a time duration of the statistical pulse of air, a total air consumption during the statistical pulse of air, a flow rate increase during the statistical pulse of air, and a flow rate decrease during the statistical pulse of air.

In other embodiments of the inventive concept, the performance signature of a pulsing valve 120 may be used to determine if the pulsing valve 120 or other components in the compressed air, fabric filter cleaning system need maintenance or replacing. Referring to FIG. 5, operations begin at block 500 where the pulsing valve 120 is operated to generate a statistical pulse of air directed to a fabric filter. The air flow monitor 135 monitors the flow of air associated with the statistical pulse of air at block 505 and the pulse valve signature analysis module 145 generates a current performance signature for the pulsing valve 120 based on the monitored flow of air at block 510. At block 515, the pulse valve signature analysis module 145 compares the current performance signature to a baseline performance signature that was previously generated for the pulsing valve 120. The pulse valve signature analysis module 145 may identify a performance deviation in the pulsing valve 120 based on a difference between the current performance signature and the baseline performance signature at block 520. As described above, the performance signatures may be based on one or more performance metrics. Thresholds may be set for each metric and, based on the number of metrics with deviations that exceed the associated threshold and/or the magnitude of deviation for each metric, a determination may be made whether a particular pulsing valve is faulty, i.e., its performance has degraded to a level that intervention may be needed in the form of maintenance or replacement. In general, when any of the performance metrics start to change, it can provide early indications of potential performance problems related to the fabric filter cleaning system 100 in general and/or specific components, such as the pulsing valve 120, solenoid pilot valve 125, various connecting tubes, pipes, etc., air delivery system components (e.g., main air supply 110 and header supply tank 115), etc. For example, if the flow rate during a statistical air pulse starts to increase at a slower rate and does not obtain the same maximum value, then it can indicate that the discharge of the solenoid pilot valve 125 may be blocked or the solenoid pilot valve's 125 plunger is moving slower due to wear. Continuous air flow above the zero mark (zero flow plus noise level related to operating environment) may be a direct indication of a leaking valve or diaphragm. Maintenance on the fabric filter cleaning system 100 may result in changes in the compressed air pressure settings and changes in the flow rates of various tubes, pipes, supply lines, valves, due to cleaning. These modifications to the system operation may make it desirable to create a new baseline performance signature for the fabric filter cleaning system 100 and the pulsing valves 120 included therein.

Figure 6:
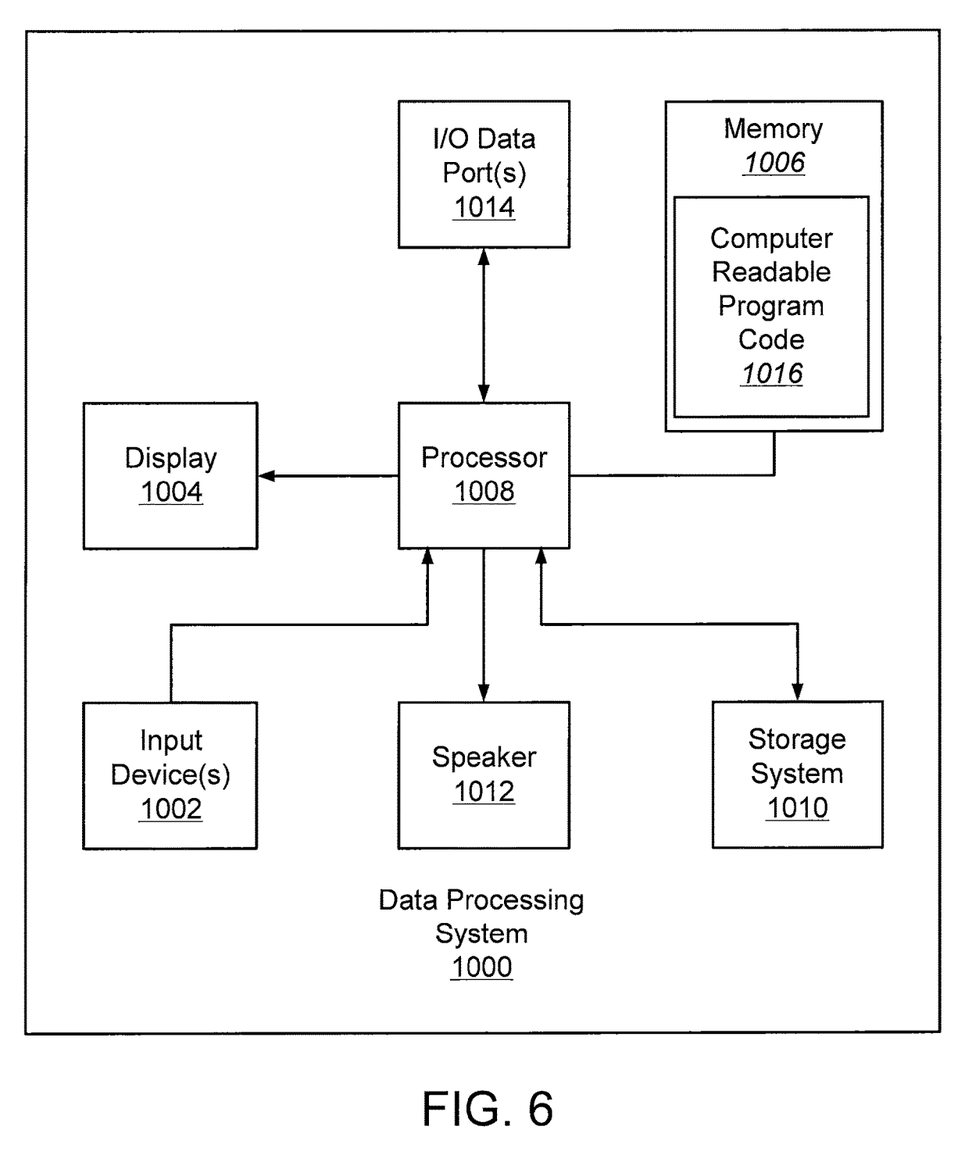
FIG. 6 is a data processing system that may be used to implement the valve controller of FIG. 1 in accordance with some embodiments of the inventive concept.

Referring now to FIG. 6, a data processing system 1000 that may be used to implement the valve controller 140 of FIG. 1, in accordance with some embodiments of the inventive concept, comprises input device(s) 1002, such as a keyboard or keypad, a display 1004, and a memory 1006 that communicate with a processor 1008. The data processing system 1000 may further include a storage system 1010, a speaker 1012, and an input/output (I/O) data port(s) 1014 that also communicate with the processor 1008. The processor 1008 may be, for example, a commercially available or custom microprocessor. The storage system 1010 may include removable and/or fixed media, such as floppy disks, ZIP drives, hard disks, or the like, as well as virtual storage, such as a RAMDISK. The I/O data port(s) 1014 may be used to transfer information between the data processing system 1000 and another computer system or a network (e.g., the Internet). These components may be conventional components, such as those used in many conventional computing devices, and their functionality, with respect to conventional operations, is generally known to those skilled in the art. The memory 1006 may be configured with computer readable program code 1016 to receive and process performance metric information collected by the air flow monitor 135 to generate a baseline performance signature for a pulsing valve and to detect performance deviations therefrom in accordance with some embodiments of the inventive concept.

Figure 7:
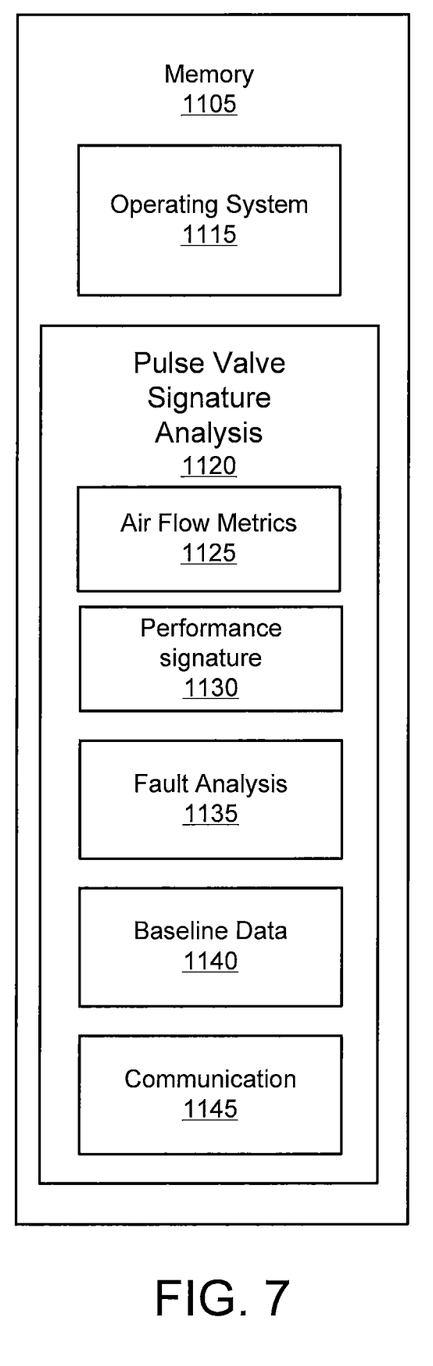
FIG. 7 is a block diagram that illustrates a software/hardware architecture for use in the valve controller of FIG. 1 in accordance with some embodiments of the inventive concept.

FIG. 7 illustrates a memory 1105 that may be used in embodiments of data processing systems, such as the valve controller 140 of FIG. 1 and the data processing system 1000 of FIG. 6, respectively, to facilitate the generation of a baseline performance signature for a pulsing valve 120 in a fabric filter cleaning system 100 and to detect performance deviations from the baseline performance signature according to some embodiments of the inventive concept. The memory 1105 is representative of the one or more memory devices containing the software and data used for facilitating operations of the valve controller 140 as described herein. The memory 1105 may include, but is not limited to, the following types of devices: cache, ROM, PROM, EPROM, EEPROM, flash, SRAM, and DRAM.

As shown in FIG. 7, the memory 1105 may contain two or more categories of software and/or data: an operating system 1115 and a pulse valve signature analysis module 1120. In particular, the operating system 1115 may manage the data processing system's software and/or hardware resources and may coordinate execution of programs by the processor. The pulse valve signature analysis module 1120 may comprise an air flow metrics module 1125, a performance signature module 1130, a fault analysis module 1135, a baseline data module 1140, and a communication module 1145. In general, the pulse valve signature analysis module 1145 may be configured to perform one or more of the operations described above with respect to the flowcharts of FIGS. 3-5. The air flow metrics module 1125 may be configured to use the communication module 1145 to communicate with the air flow monitor 135 to obtain performance metric information based on the flow of air that is associated with a statistical pulse of air to the fabric filters 105A and 105B. The performance signature module 1130 is configured to generate the performance signature based on one or more of the performance metrics that are obtained via the air flow monitor 135 to establish a baseline performance signature for the system in general and the pulsing valve 120 in particular. This baseline performance signature may be stored as baseline data 1140. The fault analysis module 1135 may be configured to identify a performance deviation in the pulsing valve 120, for example, based on a difference between a current performance signature generated by the performance signature module 1130 and the baseline performance signature stored as baseline data 1140. As described above, thresholds may be set for each performance metric and, based on the number of metrics with deviations that exceed the associated threshold and/or the magnitude of deviation for each metric, a determination may be made whether a particular pulsing valve is faulty, i.e., its performance has degraded to a level that intervention may be needed in the form of maintenance or replacement.

Although FIGS. 6 and 7 illustrate hardware/software architectures that may be used in data processing systems, such as the valve controller of FIG. 1 in accordance with some embodiments of the inventive subject matter, it will be understood that the present invention is not limited to such a configuration but is intended to encompass any configuration capable of carrying out operations described herein.

Computer program code for carrying out operations of data processing systems discussed above with respect to FIGS. 1-7 may be written in a high-level programming language, such as Python, Java, C, and/or C++, for development convenience. In addition, computer program code for carrying out operations of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

Moreover, the functionality of the valve controller 140 and the data processing system 1000 of FIG. 6 may each be implemented as a single processor system, a multi-processor system, a multi-core processor system, or even a network of stand-alone computer systems, in accordance with various embodiments of the inventive subject matter. Each of these processor/computer systems may be referred to as a "processor" or "data processing system."

Embodiments of the inventive concept have been described above by way of example in which a main air supply 110 is used with a single pulsing filter 120 to clean two fabric filters 105A and 105B. It will be understood, however, that due to the variation in baghouse sizes and designs, the system configuration may vary. Small baghouses may have a single compressed air header supply tank along one side of the baghouse. But some baghouses may be longer and use multiple header supply tanks 115 along the side of the filter structure, which is driven with a single main air supply 110. Depending on the design, header supply tanks may be interconnected or may have separate refill lines. Depending on the operation of the filter and how often valves are pulsed, multiple air flow monitors 135 may be installed at various locations in the system to monitor the air flow through the various pulsing valves 120. For example, very large baghouses use header supply tanks 115 on both sides of the filter structure and, in some cases, pulse both sides of the fabric filters at the same time. Performance metric information from these air flow monitors may be communicated to the valve controller 140 to generate performance signatures for the various pulsing valves and/or combined to generate a composite signature for the overall system. It will be further understood that different pulsing valve 120 and/or solenoid pilot valve 125 designs may have different performance characteristics for normal operation.

Further Definitions and Embodiments

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB.NET, Python or the like, conventional procedural programming languages, such as the "C" programming language, Visual Basic, Fortran 2003, Perl, COBOL 2002, PHP, ABAP, LabVIEW, dynamic programming languages, such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present disclosure of embodiments has been presented for purposes of illustration and description, but is not intended to be exhaustive or limited to the disclosure in the form disclosed. Many variations and modifications can be made to the embodiments without substantially departing from the principles of the present invention. All such variations and modifications are intended to be included herein within the scope of the present invention.

That which is claimed:

1. A system comprising:
    a fabric filter;
    an air supply system;
    a pulsing valve that is coupled to the air supply system and is configured to generate a statistical pulse of air that is directed to the fabric filter;
    an air flow monitor that is configured to monitor a flow of air associated with the statistical pulse of air; and
    a valve controller that is coupled to the air flow monitor that is configured to generate a current performance signature for the pulsing valve based on the flow of air that was monitored and to compare the current performance signature to a baseline performance signature that was previously generated for the pulsing valve, the valve controller being further configured to identify a performance deviation in the pulsing valve based on a difference between the current performance signature and the baseline performance signature.

2. The system of claim 1, wherein the valve controller is further configured to compare the performance deviation to a performance threshold and to determine that the pulsing valve is faulty based the comparison of the performance deviation to the performance threshold.

3. The system of claim 1, wherein the performance deviation comprises at least one of a reduction in a maximum air flow rate during the statistical pulse of air, a change in a time duration of the statistical pulse of air, a change in a total air consumption during the statistical pulse of air, a change in a flow rate increase during the statistical pulse of air, and a change in a flow rate decrease during the statistical pulse of air.

4. The system of claim 1, further comprising:
    a blow pipe between the pulsing valve and the fabric filter that is configured to direct the statistical pulse of air to the fabric filter.

5. The system of claim 4, further comprising:
    a pilot valve that is coupled to the pulsing valve and is configured to facilitate transitions of the pulsing valve between an open state and a closed state to generate the statistical pulse of air.

6. The system of claim 5, wherein the air supply system comprises:
 a main compressed air supply source that is coupled to the blow pipe and the pulsing valve.

7. The system of claim 6, wherein the air supply system further comprises:
 a header supply tank that is coupled between the main compressed air supply source and both of the blow pipe and the pulsing valve.

8. A method comprising:
 operating a pulsing valve that is coupled between an air supply system and a fabric filter, wherein operating the pulsing valve comprises generating a statistical pulse of air that is directed to the fabric filter;
 monitoring the flow of air associated with the statistical pulse of air; and
 generating a current performance signature for the pulsing valve based on the flow of air that was monitored;
 comparing the current performance signature to a baseline performance signature that was previously generated for the pulsing valve; and
 identifying a performance deviation in the pulsing valve based on a difference between the current performance signature and the baseline performance signature.

9. The method of claim 8, further comprising:
 comparing the performance deviation to a performance threshold; and
 determining that the pulsing valve is faulty based the comparison of the performance deviation to the performance threshold.

10. The method of claim 8, wherein the performance deviation comprises at least one of a reduction in a maximum air flow rate during the statistical pulse of air, a change in a time duration of the statistical pulse of air, a change in a total air consumption during the statistical pulse of air, a change in a flow rate increase during the statistical pulse of air, and a change in a flow rate decrease during the statistical pulse of air.

11. The method of claim 8, further comprising:
 directing the pulse of air to the fabric filter using a blow pipe between the pulsing valve and the fabric filter.

12. The method of claim 11, wherein generating the statistical pulse of air comprises:
 transitioning the pulsing valve between an open state and a closed state responsive to operation of a pilot valve.

13. The method of claim 12, wherein the air supply system comprises:
 a main compressed air supply source that is coupled to the blow pipe and the pulsing valve.

14. The method of claim 13, wherein the air supply system further comprises:
 a header supply tank that is coupled between the main compressed air supply source and both of the blow pipe and the pulsing valve.

\* \* \* \* \*